(No Model.)
E. MANSFIELD.
METHOD OF MAKING FERRULES FOR CANT HOOKS.
No. 377,038. Patented Jan. 31, 1888.
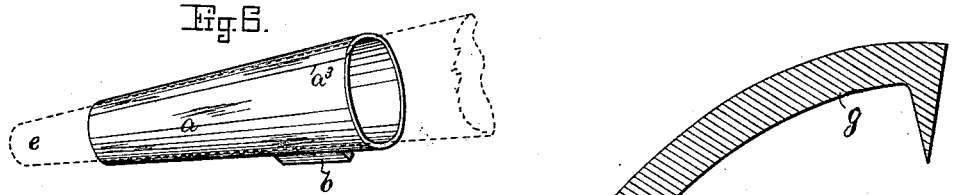
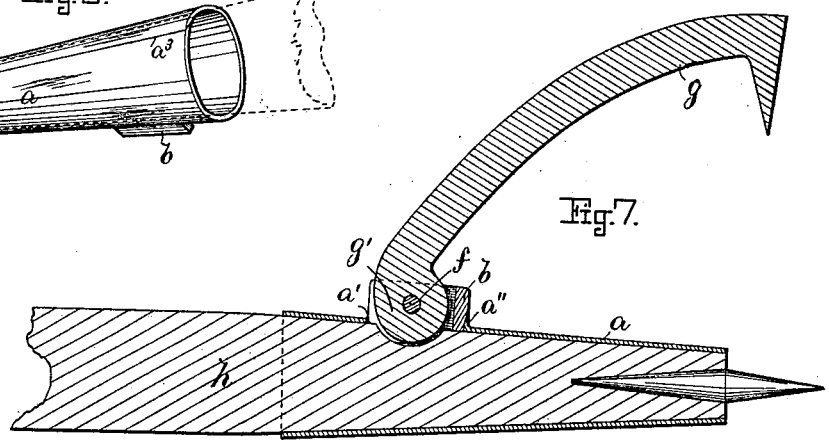
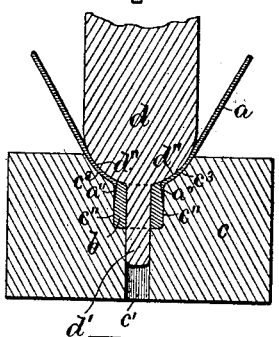
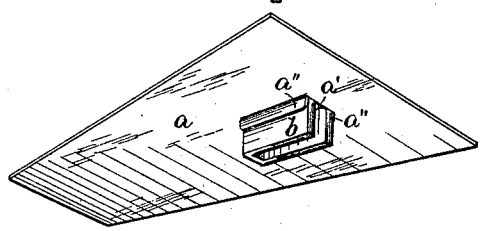
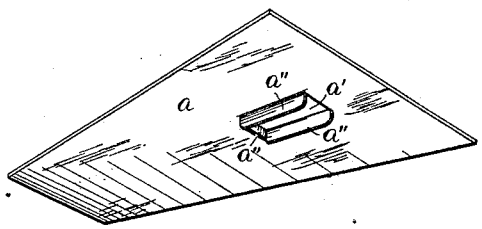
Witnesses
Henry Chadbourn.
Herbert L. Chapin.
Inventor
Edward Mansfield.
by Alban Andrew
his atty.

UNITED STATES PATENT OFFICE.

EDWARD MANSFIELD, OF ORONO, MAINE.

METHOD OF MAKING FERRULES FOR CANT-HOOKS.

SPECIFICATION forming part of Letters Patent No. 377,038, dated January 31, 1888.

Application filed October 10, 1887. Serial No. 251,905. (No model.)

*To all whom it may concern:*

Be it known that I, EDWARD MANSFIELD, a citizen of the United States, and a resident of Orono, in the county of Penobscot and State of Maine, have invented a new and useful Improvement in Methods of Making Ferrules for Cant-Hooks, of which the following, taken in connection with the accompanying drawings, is a specification.

This invention relates to an improved method of making ferrules for cant-hooks, and it is carried out as follows, reference being had to the accompanying drawings, where—

Figure 1 represents a plan view of the steel plate from which the ferrule is made. Fig. 2 represents a perspective view of such plate after it has been punched. Fig. 3 represents a perspective view of the wrought and bent staple for forming the lips to which the hook is pivoted. Fig. 4 represents a perspective view of the perforated ferrule-plate and the bent staple preparatory to welding such parts together. Fig. 5 represents a sectional view showing the punch and die for welding the perforated plate and staple together and bending partially the ferrule-plate. Fig. 6 represents a perspective view of the ferrule after being bent on the mandrel and welded together; and Fig. 7 represents a central longitudinal section of the complete ferrule, with its wooden handle and the cant-hook pivoted to the lips of said ferrule.

Similar letters refer to similar parts wherever they occur on the different parts of the drawings.

In carrying out my invention I proceed as follows: I first cut or punch out from weld steel or suitable forged or wrought metal a plate, $a$, as shown in Fig. 1. Said plate is heated and a perforation, $a$, made through it by means of a suitable punch and die, and in making such perforation lips $a''$ are formed, preferably on three sides of the said perforation, as shown in Fig. 2, such lips being made to project on the under side of the plate $a$, as shown in Fig. 2. I now make a staple, $b$, of steel or wrought metal, as shown in Fig. 3, which staple I introduce within the perforation $a'$ in the plate $a$ and within the lips or flanges $a''$, as shown in Fig. 4. I now heat the plate $a$ and staple $b$ to a welding heat and weld said parts together by means of a die, $c$, having a perforation, $c'$, equal to the opening desired to receive the eye of the cant-hook, and having a recess, $c''$, of the form and shape desired to be given to the staple $b$, the upper portion of said die having concave portions $c^3 c^3$ in its upper end for partially bending the plate $a$.

Combined with such die $c$, I use a male die or plunger, $d$, having a projection, $d'$, corresponding in shape to the recess $c''$, and having convex portions $d'' d''$, corresponding in shape to the concave parts $c^3 c^3$ on the die $c$, as shown in Fig. 5. These dies and plungers may be used in a machine-drop or forging-machine, or the parts welded together by hand-labor, as may be desired, without departing from the essence of my invention.

After such parts are shaped and welded together, as above described, I reheat the plate $a$ and bend it over a conical mandrel, $e$, (shown in dotted lines in Fig. 6,) and weld and close together the overlapping edges of said ferrule at $a^3$, as shown in Fig. 6. The ferrule is now finished, and I punch or drill a hole through the staple $b$ for the reception of the bolt or rivet $f$, to which the eye $g'$ of the cant-hook $g$ is pivoted, as usual, as shown in Fig. 7.

$h$ is the wooden rod, the end of which is driven into the ferrule, as is usual in devices of this kind.

I am aware that cant-hook ferrules have been cast and provided with a flanged eye or staple for receiving the inner end of the pivoted cant-hook, and I wish to state that I do not claim such a cant-hook ferrule as my invention; but What I wish to secure by Letters Patent, and claim, is—

The herein-described method of making cant-hook ferrules, consisting in first punching or cutting out a plate, $a$, of steel or wrought metal, making a perforation, $a'$, in such plate and forming lips $a''$ at the edges of said perforation, then inserting therein a steel or forged metal staple, $b$, and welding said parts together, as described, and finally bending the plate $a$ on a suitable mandrel and welding its abutting or overlapping edges together, substantially in a manner and for the purpose set forth.

In testimony whereof I have signed my name to this specification, in the presence of two subscribing witnesses, on this 6th day of October, A. D. 1887.

EDWARD MANSFIELD.

Witnesses:
ALBAN ANDRÉN,
HENRY CHADBOURN.